Figure 1:
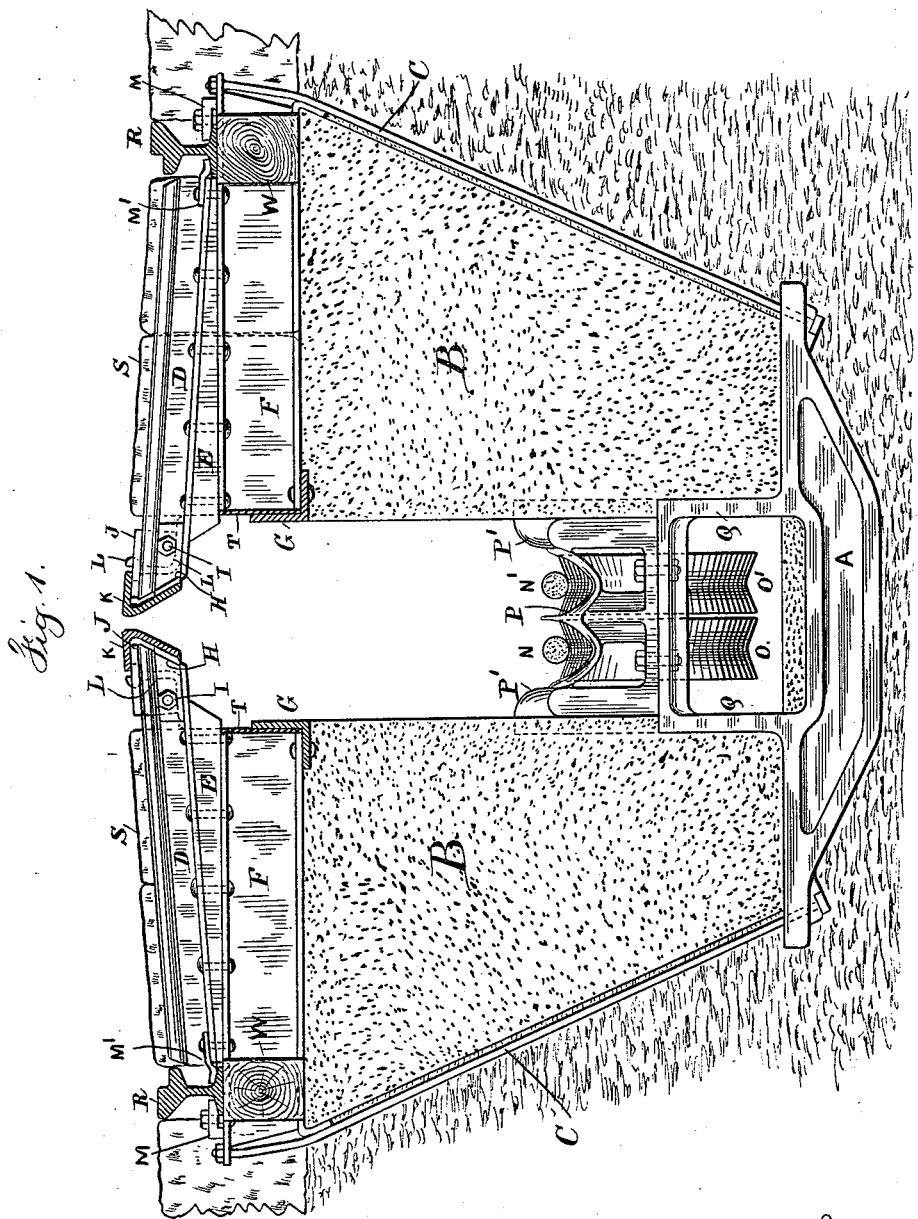

(No Model.) 7 Sheets—Sheet 1.

J. H. PENDLETON.
CABLE RAILWAY.

No. 436,102. Patented Sept. 9, 1890.

Witnesses
Chas. H. Smith
J. Staib

Inventor
John H. Pendleton
per Lemuel W. Serrell
Atty (No Model.) 7 Sheets—Sheet 2.

J. H. PENDLETON.
CABLE RAILWAY.

No. 436,102. Patented Sept. 9, 1890.

(No Model.) 7 Sheets—Sheet 3.

J. H. PENDLETON.
CABLE RAILWAY.

No. 436,102. Patented Sept. 9, 1890.

Witnesses
Chas H Smith
J. Staib

Inventor
John H. Pendleton
per Lemuel W. Serrell
Atty (No Model.) 7 Sheets—Sheet 5.

J. H. PENDLETON.
CABLE RAILWAY.

No. 436,102. Patented Sept. 9, 1890.

Witnesses
Chas. H. Smith
J. Staib

Inventor
John H. Pendleton
per Lemuel W. Serrell
atty

THE NORRIS PETERS CO., PHOTO-LITHO., WASHINGTON, D. C.

(No Model.) 7 Sheets—Sheet 6.
J. H. PENDLETON.
CABLE RAILWAY.
No. 436,102. Patented Sept. 9, 1890.
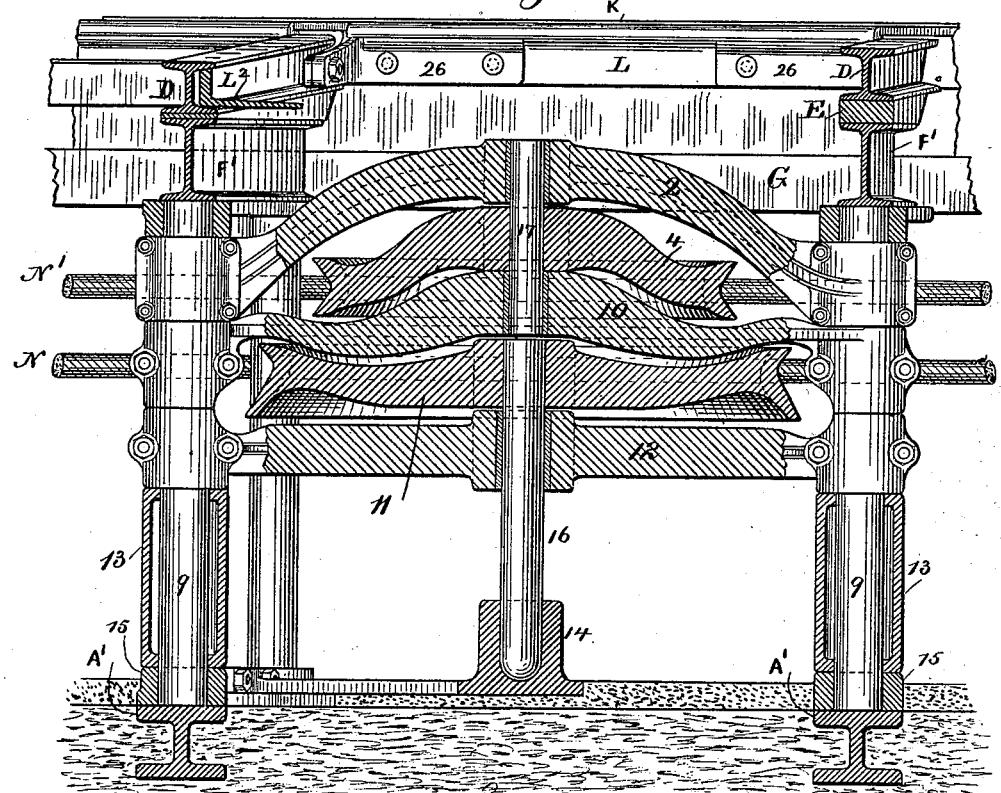
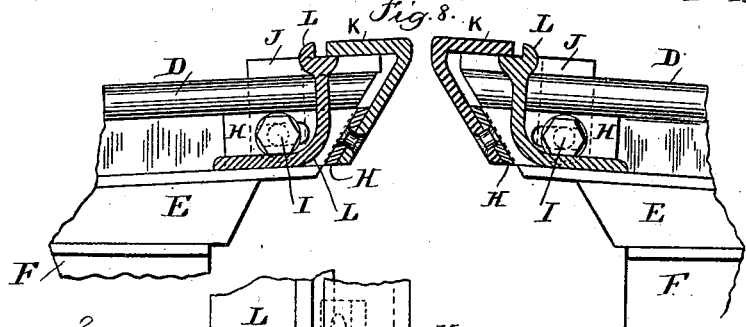
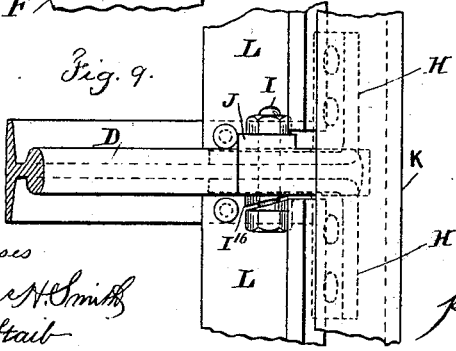
Witnesses
Chas. H. Smith
J. Staib
Inventor
John H. Pendleton
per Lemuel W. Serrell
Atty (No Model.) 7 Sheets—Sheet 7.
J. H. PENDLETON.
CABLE RAILWAY.
No. 436,102. Patented Sept. 9, 1890.
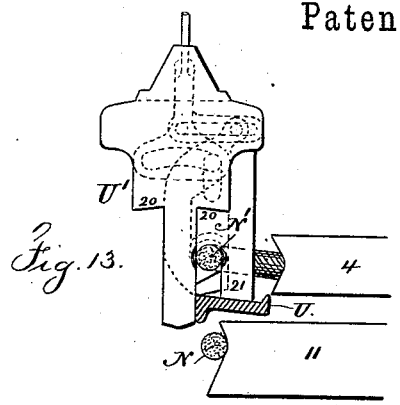
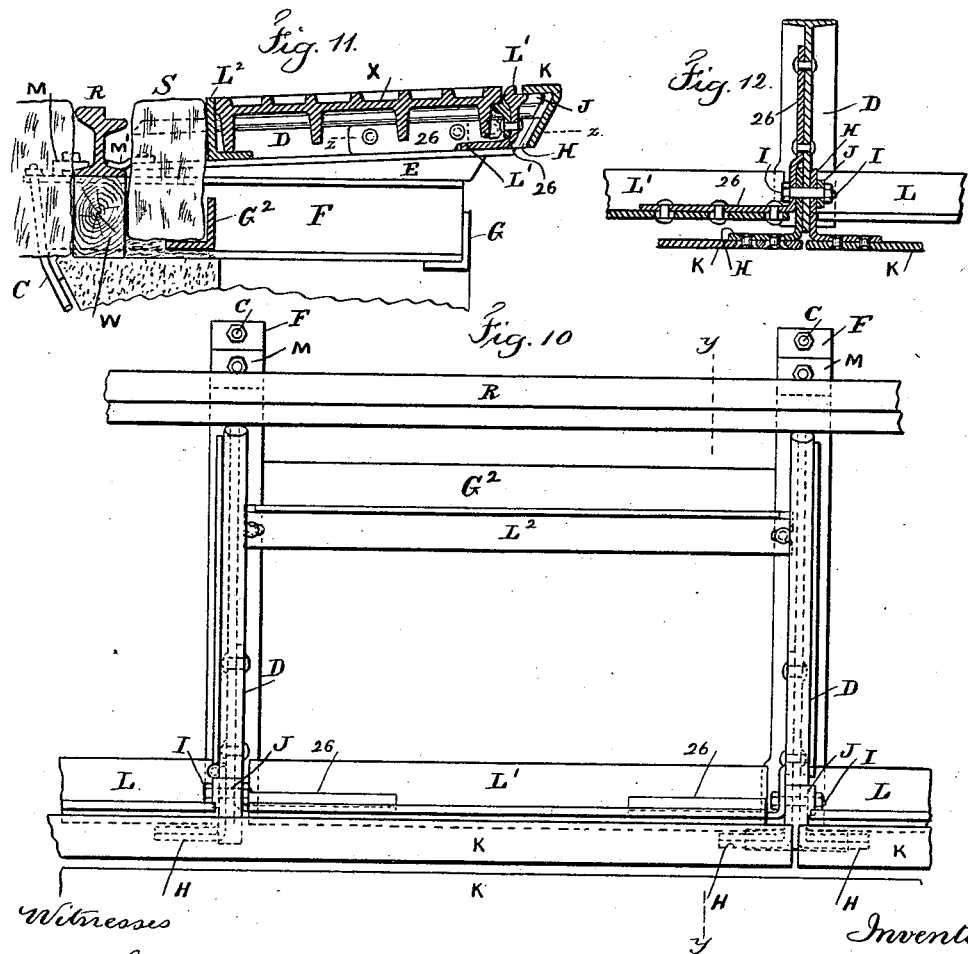
Witnesses  Inventor

UNITED STATES PATENT OFFICE.

JOHN H. PENDLETON, OF BROOKLYN, ASSIGNOR TO THE RAPID TRANSIT CABLE COMPANY, OF NEW YORK, N. Y.

CABLE RAILWAY.

SPECIFICATION forming part of Letters Patent No. 436,102, dated September 9, 1890.

Application filed March 18, 1890. Serial No. 344,324. (No model.)

*To all whom it may concern:*

Be it known that I, JOHN H. PENDLETON, a citizen of the United States, residing at Brooklyn, in the county of Kings and State of New York, have invented an Improvement in Cable Railways, of which the following is a specification.

The object of this invention is to provide two cables traveling in the same direction, so that the cars can be propelled by either one of the cables. Hence if one cable becomes injured the cars can be run by the other cable, or half of the cars can be run by one cable and the other half by the other cable, thus allowing for the use of smaller cables and for preventing delays in case of injury.

Efforts have heretofore been made to use two cables in the same trench; but in passing around curves one cable is likely to interfere with the grip or connection to the other cable, and this difficulty is enhanced where one car is connected to one cable and the next car to the other cable.

My present improvements relate to the construction of the supports for the slot-rails and to the supports for the cable-wheels and to the arrangement and construction of the supporting-wheels and devices made use of in connection with such wheels where the cables pass around the curve in either one direction or the other. I have found that by raising the cable at the inner side of the curve above the cable on the outer side of the curve the grip mechanism connecting with the one cable can be kept from contact with the supporting mechanism and the other cable both in entering and leaving the curve, and by making the upper wheels that take the inner cable on the curve of smaller diameter than the lower wheels that take the outer cable more space is provided for the respective grips, and the gripping device for the lower and outer cables of the curve is entirely clear in a perpendicular direction from the upper and inner cable of the curve, and the mechanism that grips the inner cable is raised with that inner cable as it comes to the upper wheels of the curve and above the outer cable of the curve, so as not to come in contact with the same, and where there is a compound curve, first to the right and then to the left, the inner cable of the curve is brought up to the inner wheels of the curve, while the lower and outer cable remains on nearly the
same level, and in passing from the right-hand curve to the left-hand curve the upper cable on the right-hand curve passes down and to the lower and outer wheels of the left-hand curve, and the lower and outer cable of the right-hand curve passes up to the upper and inner wheels of the left-hand curve. Thereby the cables are kept at a sufficient distance one from the other where they cross each other in going from one curve to the other to be out of the way of the grip devices that rise and fall with the respective cables as they are moved along with them.

Figure 2:
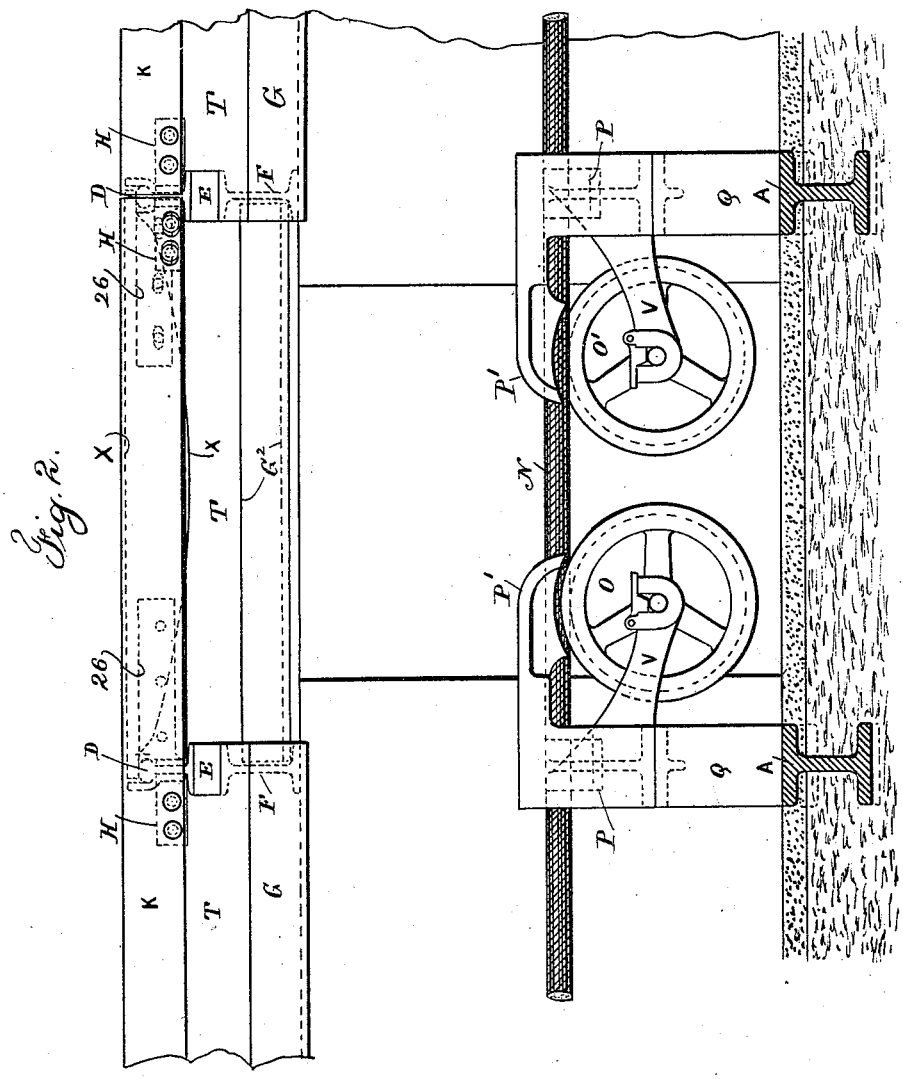
Figure 3:
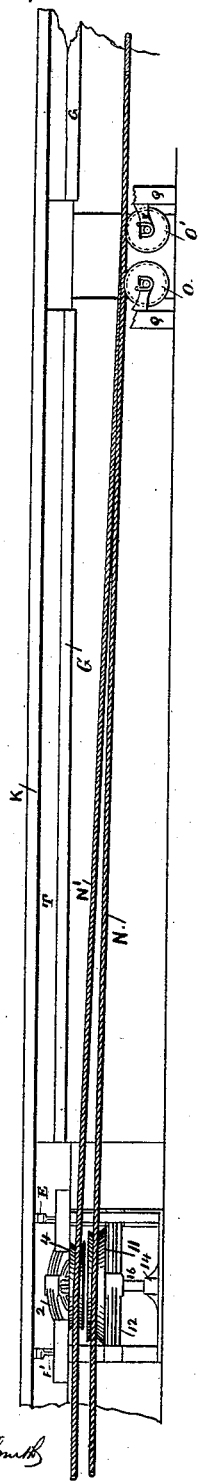
Figure 4:
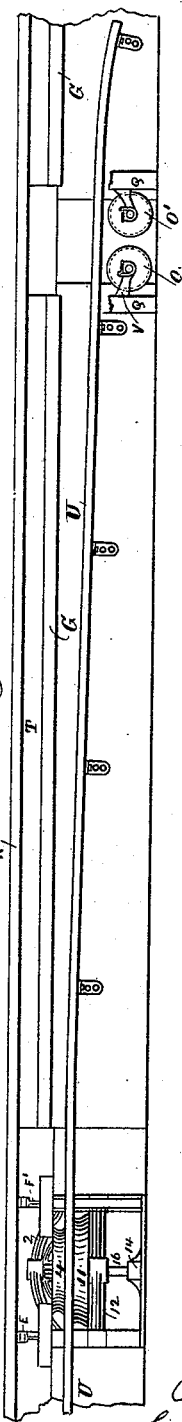
Figure 5:
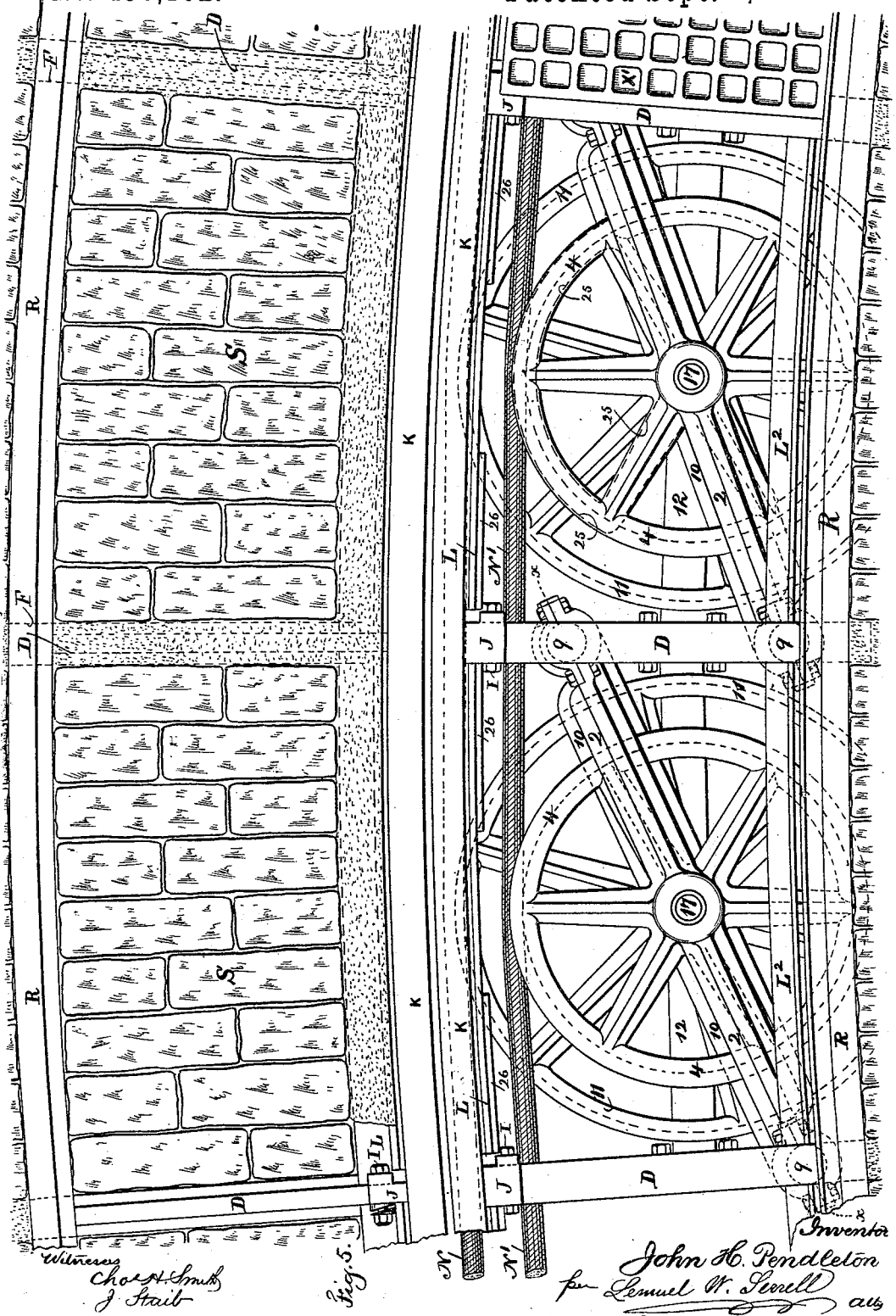
Figure 6:
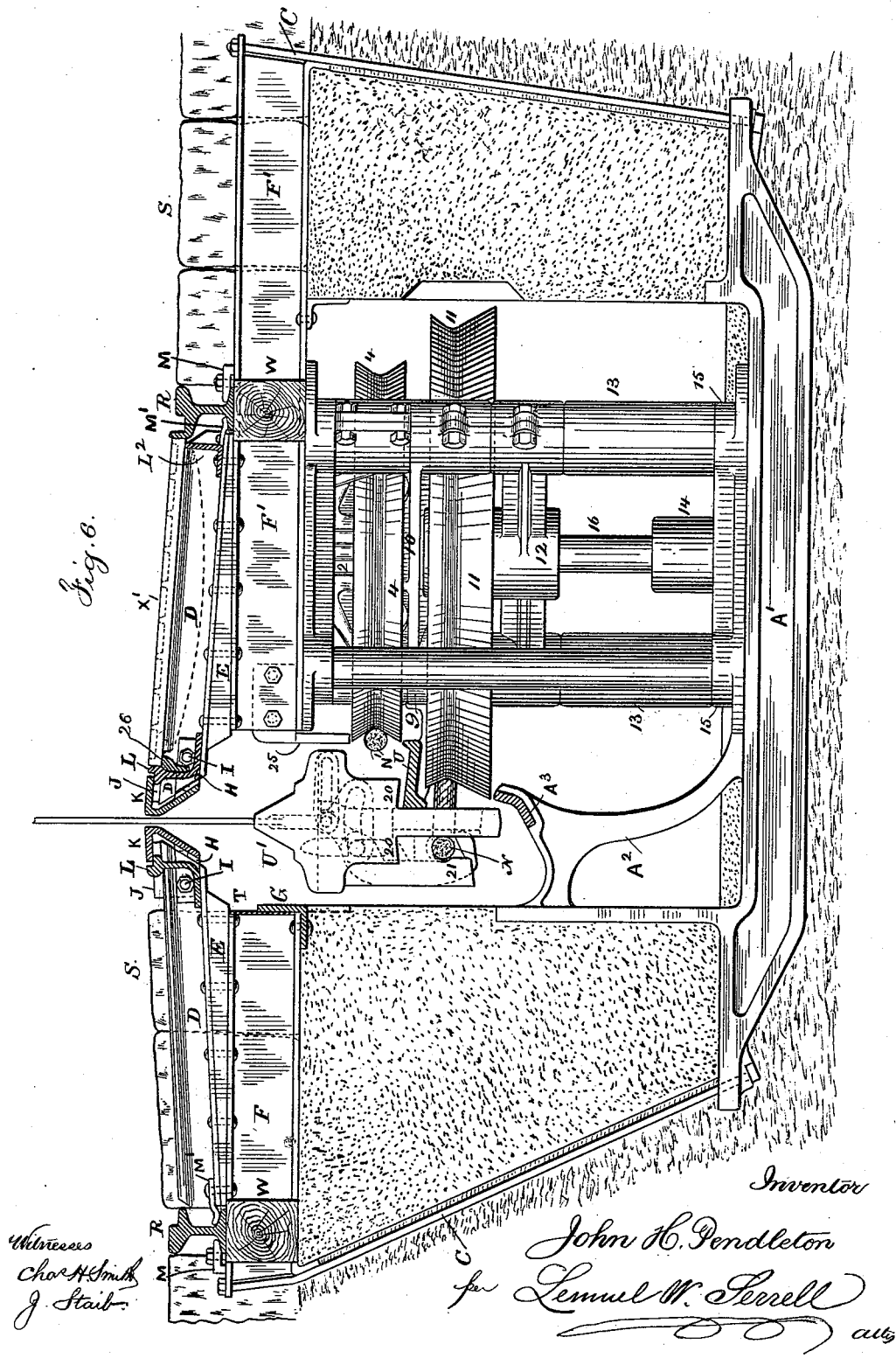

In the drawings, Figure 1 is a vertical section transversely of the trench at the straight portion of the road. Fig. 2 is a vertical section longitudinally of the trench and at one of the man-hole plates. Fig. 3 is a longitudinal section, in smaller size, of the trench and an elevation of the cables without the lifting-rail. Fig. 4 is a similar view of the trench with the lifting-rail and without the cables, the two views being thus represented to avoid confusion of the parts. Fig. 5 is a general plan view of a portion of the cable-wheels and parts upon a curve, two of the man-hole plates being removed. Fig. 6 is a vertical transverse section of a trench and an elevation of the cable-wheels at the commencement of the curve. Fig. 7 is a section at the line $x$ $x$ of Fig. 5, and Fig. 8 is a section in larger size of the slot-rails and parts connected with the same. Fig. 9 is a plan view of the parts shown in Fig. 8 at the left-hand side of the slot between the slot-plates. Fig. 10 is a plan view of the structure at one of the man-holes upon the straight portion of the road, the man-hole plate and paving being in place. Fig. 11 is a section at the line $y$ $y$ of Fig. 10. Fig. 12 is a sectional plan at the line $z$ $z$ of Fig. 11. Fig. 13 is a view representing the grip when connected to the inner cable.

I find it advantageous to place cable-wheels and man-holes to give access to the same at about thirty to fifty feet apart and to make use of four or five intermediate transverse frames for supporting the parts of the trench-inclosure. The transverse frames are similar, but those that are provided at the manholes also receive the supports for the vertical cable-wheels.

Each transverse frame is made of a lower buckstay A, preferably of cast-iron. These buckstays A are set in the trench in the proper positions, and they are provided with the diagonal tie-bolts C, extending up to near the surface of the roadway, and the trench is to be filled in with concrete, as shown at B, leaving a central channel-way for the reception of the cables N N' and the cable-wheels O O', that support the same, and at the places where the wheels O O' are provided such buckstays are extended up in the form of side frames Q, the width between which corresponds to the width of trench between the concrete at B, and there are brackets V extending outwardly and toward each other from the frames Q and terminating with boxes receiving the cross-shafts of the cable-wheels O O'. These journal boxes or bearings for the cable-wheels are of any desired character. Usually they are lined with Babbitt metal and provided with hinged caps, as shown, so that these caps can be swung back and the shaft and wheel lifted out for repairs or for the reception of another wheel, and it will be observed in Fig. 2 that the wheels O O' are upon separate shafts and one in advance of the other, and one wheel is adapted to one cable and the other wheel to the other cable. Hence one wheel is not in the way of the other wheel, and this construction facilitates access to the wheels even while the cables are in motion, and between the frames Q there are double-yoke-shaped guides P, that prevent either cable slipping off its wheel, and in addition to these there are side guides P', extending out over and adjacent to the outer edges of the respective cable-wheels to prevent the cable slipping off the cable-wheel and passing down between the cable-wheel and the frame Q. It will be seen that in consequence of the brackets or arms V extending in opposite directions toward each other from the buckstays with the boxes on the ends of the arms there is an open space to give easy access for inserting or removing the pulleys.

A man-hole is provided adjacent to each pair of cable-wheels, and the concrete B is recessed beneath the man-hole, so as to give access to the cable-wheels and boxes for cleaning, oiling, or repairing, and the man-hole is covered by a removable plate X, supported by the iron-work that sustains the railway-rails and the slot-rails, as hereinafter described.

Resting upon the top of the concrete B are the iron beams F, preferably I-shaped in section, and they are united to each other by longitudinal L-irons G at the inner edges of the concrete at each side of the trench, and the tie-bolts C pass up and through the top flanges of the wrought-iron beams F, so that such beams are held down firmly at their outer ends, and between these beams may be placed longitudinal sills W of wood, and they are directly beneath the track-rails R, which track-rails R rest upon the tops of the iron beams F and are secured to the same by the clips M and M'.

Upon the top of each of the wrought-iron beams F there is a wedge-bar E, and resting upon each wedge-bar E is a deck-beam D, and the inner ends of these deck-beams are cut off diagonally to facilitate the reception of the slot-rails, hereinafter described, and the deck-beams D, wedge E, and wrought-iron beams F are firmly secured together, preferably by rivets passing through the flanges of the deck-beams D and iron beams F, and the outer ends of these deck-beams D are adjacent to the track-rails R, and the clips M', that hold the rails, preferably rest upon the flanges of the deck-beams D. At the ends of the deck-beams are the slot-rails K, that are of iron or steel, the top member being level and the other member inclined outwardly at an acute angle. Angle-braces are provided all along the track between the respective deck-beams and slot-rails on each side of the slot, so that the slot-rails K are connected firmly to the deck-beams, and the slot-rails are of considerable strength in consequence of their triangular form, as represented in Figs. 1 and 6, and the beveled or inclined portion of each slot-rail is adjacent to the beveled end of the deck-beam, and these angle-iron braces H are riveted to the slot-rails and secured by bolts I, which pass through slots in the deck-beams, so that a slight movement is allowed for in adjusting the position of the slot-rails in relation to the ends of the deck-beams for regulating the width of the slot between the slot-plates, and this adjustment can be made by loosening the bolts I, if necessary, and the slot-rails may be wedged apart by the insertion of a suitable lever-tool in the slot adjacent to the deck-beams should it become necessary. The nearly horizontal upper members of the slot-rails do not rest directly upon the surfaces of the deck-beams D; but there are angle-braces J, which may be riveted to the under faces of the slot-rails and rest upon the deck-beams D and extend down at the sides of such deck-beams, and are provided with holes for the bolts I, so that the slot-rails and the angle-braces H and J can be moved together in adjusting the slot-rails, and they are secured by tightening such bolts I.

Between one deck-beam and the next all along the track and adjacent to the slot-rails are the iron slot-rail supports L, that are L-shaped in section and provided with a longitudinal lip for supporting and strengthening the edges of the slot-rails that rest upon such lip, and the ends of these slot-rail supports may be flanged and perforated for the passage of the bolts I; but the bottom portions of these slot-rail supports at their ends rest upon the flanges of the deck-rails D and are preferably permanently attached by bolts or rivets, and it will be seen by reference to Fig. 1 that there is a space between the outer edge of each slot-rail and the upper edge of the slot-rail supports to allow for the slot-rails being moved to open the slot wider when necessary, and by inserting a wedge or suitable tool between the top edge of the slot-rail support and the edge of the slot-rail such slot-rail may be forced inwardly to lessen the width of the slot. I have shown a spring-washer at $I^{16}$, Fig. 9, around the bolt I and between the head of said bolt and the angle-brace H, which spring yields when the slot-rail is moved, thereby avoiding the necessity of loosening the bolt I when it is necessary to adjust the slot-rails.

In constructing this trench for cables it is preferable to introduce a vertical sheet or plate of iron, as at T, between the edge of the filling-piece and the vertical member of the angle-iron G to prevent any substance falling into the trench in applying the pavement, and I have represented the paving-stone blocks at S, the same being inserted between the respective track-rails R, slot-rail supports L, and the deck-beams D, and the spaces above the deck-beams and also within the slot-rail supports L are preferably closed with bituminous concrete or any suitable material, there being recesses left adjacent to the nuts of the bolts I to be filled with sand or earth, so that the nuts of these bolts I can be turned without breaking up the roadway.

Upon reference to Figs. 2 and 11 it will be seen that the cast-iron man-hole plate X is applied over the man-hole opening and that the angle-iron G is stopped at opposite sides of this opening and a separate piece of angle-iron inserted at $G^2$ between the beams F and outside of the man-hole opening, and there is a filling-piece or support $L^2$ between the deck-beams upon which the man-hole plate X rests at this side, and the iron slot rail-support L', that is adjacent to the man-hole plate, may be made with a rib, as shown in Fig. 6, for the edge of the man-hole-plate to rest upon, or there may be an additional bar 26, Fig. 11. In other respects the structure adjacent to the man-hole may be the same as before described. By removing the man-hole plate access is given to the trench adjacent to the wheels O O' for supporting the cable.

The wheels 4 and 11 are applied one above the other and at suitable distances apart at the concave side of each curve in the roadway, and the cable that is next to these wheels upon the straight part of the track, which, for convenience, is called the "inner cable," is carried up upon the wheels 4, and the adjacent or outer cable runs upon the wheels 11 in order that the two cables may not rub against each other and that they may occupy a definite position in their movements.

In Fig. 3 the inner cable N' is shown as carried up to the cable-wheels 4, and the cable N is run at nearly the ordinary level upon the lower wheels 11, and in Fig. 5 I have shown two pairs of these wheels, and it is to be understood that they are continued in nearly the same relation to one another all around the inner side of the curve, and I remark that the structure of the trench at the outer or convex side of the curve is substantially the same as before described, the tracks, slot-rails, and slot-rail supports being curved upon the proper radius, and the deck-beams, the wedge-bars, the slot-rails, and the track are substantially the same above the wheels 4 and 11 as in the other portions of the track, except that the parts are adapted to receive the movable covers X', that are similar to the man-hole covers, their upper surfaces being suitably corrugated or ribbed, and the slot-rail supports are provided with lips, as aforesaid, for the support of such movable covers, and the angle-irons or filling-pieces $L^2$ support the edges of such movable covers adjacent to the track-rails R, and it is advisable to provide the track-rails on the inner side of the curve with flanges, as usual, in order that the flanges of the wheels may run in a groove. The wrought-iron beams F' are longer than the beams F, and the buckstays A' are also longer than the buckstays A in order that they may be adapted to the reception between them of the vertical columns 9, there being suitable castings upon the upper surfaces of the buckstays and at the under sides of the beams F' for the reception of the ends of such columns 9, and these columns 9 are adapted to receive between them the cross-bearers 2, 10, and 12 for the axis 17 of the wheel 4 and the axis 16 of the wheel 11, and it is preferable to make these cross-bearers with cap-pieces secured by bolts, so that the bearers may be firmly clamped upon the respective columns 9, and there are sleeves or distance-pieces 13 around the respective columns 9 for supporting the ends of the cross-bearers 12.

Upon reference to Fig. 7 it will be seen that there is a socket 14 upon the casting that contains sockets 15 for the lower ends of the columns 9 and that rests upon the buckstays A', and that this socket 14 receives the lower end of the shaft or axis 16 of the cable-wheel 11, and the axis 17 of the cable-wheel 4 is supported at top and bottom by the cross-bearers 2 and 10. By placing these columns 9 between the buckstays and the beams the respective cross-bearers can be arranged in diagonal positions, as represented in Fig. 5, and the cross-bearers will not be in a position to interfere with the cables, and the other parts of the structure can be properly supported from these columns 9, and the two cable-wheels 4 and 11 can be kept comparatively close together, it only being necessary to have the space required for the cross-bar 10 to pass out from between them.

Upon reference to Figs. 5 and 7 it will be seen that the ends of the cross-bearers 2, 10, and 12 are made with cap-pieces that are bolted to the bearers and serve to clamp the bearers to the vertical columns 9, the object of this construction being to allow access to the respective wheels 4 and 11 by removing the caps at one end of each bearer and loosening the bolts at the other ends of such bearers, so that the parts can be swung partially around upon one of the columns to give access to either wheel 4 or 11 or the shaft of the same to repair or replace either one, and by a reverse movement the parts can be swung back to place.

The buckstay A' is provided with a frame A², and from one buckstay to the other there are longitudinal inclined bars A³, which serve to prevent the cable dropping down beneath the lower wheel 11, the upper edges of such bars A³ being adjacent to the under edges of these cable-wheels 11.

The inclined track U commences near the last pair of wheels on the straight portion of the structure, as indicated in Fig. 4, and it is suitably supported by brackets from the interior of the structure, and it extends up above the cable-wheels 11 and between them and the cable-wheels 4, as seen in Fig. 6, and the grip mechanism represented at U' is adapted to take either the cable N or the cable N', and it has a shoulder or offset at 20 upon each side, and the mechanism is constructed so as to grasp the cable N upon the left side of the grip mechanism, as shown in Fig. 6, and the cable N' on the right side of the grip mechanism, as seen in the detached view, Fig. 13, and when the grip mechanism has hold of the cable N, as seen in Fig. 6, the offset 20 is above the track U and slides against the outer edge of that track, so that the grip mechanism is supported thereby against the strain of the cable, and in either position the main body of the cable mechanism occupies a central position within the trench; but when the inner cable N' on the right side, as seen in Fig. 13, is grasped by the grip mechanism the lifter 21 of the grip slides upon the upper surfaces of the inclined track U, lifting up the grip mechanism bodily in order that it may follow the inclination of the cable N', as seen in Fig. 3, and the lifter 21, sliding upon the top of the track U, and the body of the grip mechanism sliding against the outer edge of such track, as seen in Fig. 13, causes the grip to be properly supported as it is carried by the cable around the curve, and the cable N' itself is carried at a little higher level than the groove in the wheel 4, so that such cable is laid reliably in the groove of the wheel 4 as the grip mechanism passes along.

The grip mechanism that is represented is similar to that shown in my application, Serial No. 344,325, filed March 18, 1890, and which may be used is not a double grip, but a single grip, adapted to grasping either one cable or the other; but I do not limit myself in this particular, as the car and the grip mechanism might be turned around bodily, so as to take hold of either one cable or the other cable; and it will be understood that in all instances the inner cable of the curve is carried above the outer cable, and that the grip mechanism is carried up or down by the inclined track U, and in consequence of being carried up when it is connected with the inner cable of the curve it is sufficiently high to be out of the way of the outer cable of the curve, and that the two cables do not approach each other sufficiently near to cause the one or the other of the grip mechanisms to come in contact with the cable to which it is not connected. It will now be understood that when the grip mechanism is being carried by the inner cable of the curve it is elevated into the position represented in Fig. 13 by the track U, and the cable N' is laid back into the upper cable-wheels 4 as the grip passes along, and the grip mechanism descends at the end of the curve as the cables pass upon the straight-line structure. If now the structure has a curve in the opposite direction, the cable N' becomes the outer cable on such curve, and the grip mechanism is not lifted, and it remains in the position indicated in Fig. 6, as it travels around the curve with the cable N' adjacent to and supported by the wheel 11, and in this case the cable N becomes the inner cable of the curve and travels upon the upper wheels 4. Hence if the grip mechanism U', Fig. 6, which is connected with the cable N', approaches a curve in the opposite direction—say to the left—the lifter 21 of the grip comes over and rests upon the inclined track U, and it is thereby raised so as to follow the line of the cable N' as it ascends to the wheels 4 of such opposite curve, and it will be apparent that a sufficient distance will be provided in the structure where there is a compound curve first to the right and then to the left, or vice versa, for the introduction of the rising track U, in order that such track may lift the grip mechanism, because in the space between the curve in one direction and in the other direction the cable N' that has been upon the lower wheel 11 is the outer cable of the curve, and it passes up to the wheels 4 upon the curve in the opposite direction, and thereby becomes the inner cable of the curve and travels in the wheels 4, and the cable N, passing downwardly from the wheel 4 to the wheel 11 on one curve, and the cable N', passing upwardly from the wheel 11 to the wheel 4 on the other curve, do not touch where they cross each other, because the wheels 11 keep the outer cable near that side of the trench until it reaches the wheels 4, which are near the same surface of the trench, and the cable N' in passing down from the wheels 4 near the inner surface of the curved trench reach the lower wheels 11 upon the curve in the opposite direction, which, being larger, keep such cable N' toward the same side of the trench that it before occupied, and there is sufficient space between one cable and the other where they cross each other vertically for the portion of the grip which intervenes between such cables.

It will be apparent that the track U where it approaches the curve can be easily supported from the respective buckstays, and that where it passes around the curve it will be supported by brackets from the columns 9, as shown in Fig. 6.

To prevent the upper cable coming above the top of the cable-wheel 4 upon a curve in consequence of any sudden movement given to the car or grip, I make use of a deflector-guard 25, extending out from the frame and being above such cable-wheel 4, as shown in Fig. 6. It is only necessary to have this deflector-guard of comparatively short length and above the central portion of the wheel adjacent to where the cable is in contact with the same. This deflector-guard may be a segment of a circle and be in one piece with the cross-bearer 2, as illustrated by dotted lines at 25 in Fig. 5.

The track-rails are usually about thirty feet long, and I find it preferable to bring the ends of these track-rails near to the man-hole plates, so that the expansion and contraction may be provided for at this place, and the slot-rails should be of the same length, and the joint between them also made near the man-holes, and when the slot-rail supports L are permanently united at their ends to the flanges of the deck-beams expansion and contraction should also be allowed for adjacent to the man-holes. With this object in view I prefer to place two buck-stays and the parts carried by the same about two or three feet apart, one at each side of the man-hole, so that the slot-rail supports L', passing over the man-hole, may be comparatively short, as seen in Figs. 10 and 11, and at its ends are angle-irons 26, that are bolted or riveted to the adjoining deck-beams D and bolted or riveted to the slot-rail supports L', the holes for the bolts or rivets being sufficiently elongated to allow for expansion and contraction, (see Fig. 2,) and this slot-rail support should be about a quarter of an inch less in length than the distance between the deck-beams at the average temperature in order to allow for the expansion of the structure at a maximum temperature.

I claim as my invention—

1. The combination, in a structure for underground cables, of the buckstays A, the concrete at the opposite sides of the trench, the wrought-iron beams F, the stay-bolts, the wedge-bars upon the wrought-iron beams, the deck-beams resting upon the wedge-bars, and the slot-rails connected at the ends of the deck-beams, substantially as set forth.

2. The combination, with the beams F, of the wedge-bars E, the deck-beams D, supported by the wedge-bars, the slot-rails, and the angle-braces connecting the slot-rails and the deck-beams, substantially as set forth.

3. The combination, with the slot-rails and angle-braces, of the beams D, to which the angle-braces are connected, and the slot-rail support L between the beams D, having lips for supporting the outer edges of the slot-rails, substantially as set forth.

4. The combination, with the buckstays and stay-bolts, of the beams F, secured by the stay-bolts, the concrete or similar material supporting the beams, and the angle-irons G, connecting the inner ends of the beams F and resting upon the concrete, and the slot-rails and connections between the same and the beams F, substantially as set forth.

5. The combination, in a trench-cable structure, of the buckstays A, the cable-wheels O O', and the separate pairs of bracket-arms V, and boxes extending in opposite directions toward each other from the respective buckstays for supporting the cable-wheels, and a man-hole and removable plate provided in the structure for giving access to the two cable-wheels for removing or repairing either one without disturbing the other, substantially as set forth.

6. The combination, with the buckstays and the frames upon the same within the trench, of the arms and journal-bearings V, the cable-wheels and their shafts supported by such bearings, and the guides P' above the cable-wheels and extending out from the buckstay frames for retaining the cable in position, substantially as set forth.

7. The combination, with the buckstays and the two parallel cables in a trench, of the cable-wheels O O' and the frames on the buckstays for supporting the same and the guides P between the buckstays and in the form of inverted yokes for keeping the cables separate and for preventing them becoming displaced, substantially as set forth.

8. The combination, in a trench structure for two cables, of wheels for supporting the cables side by side and parallel in the straight portion of the structure and wheels one above the other on the curved portion of the structure, the inner cable upon the curve running continuously upon the upper cable-wheels as it passes around the curve and the outer cable running continuously upon the lower cable-wheel of the curve, and a grip mechanism adapted to being raised or lowered to the level of either cable on the curve, substantially as set forth.

9. The combination, in a trench-cable structure, of two cables and their supporting-wheels upon the straight portion of the structure, cable-wheels upon the curved portion of the structure placed one above the other so that the cable on the inner side of the curve may be elevated above the cable on the outer side of the curve, and a stationary inclined track for raising the grip mechanism and causing it to follow the elevated cable on the inner side of the curve, substantially as set forth.

10. The combination, with the cable-wheels 4 and 11, of the columns 9, the buckstays and iron beams above and below the columns, and the cross-bearers above and below the cable-wheels and between the columns for supporting the axes of the cable-wheels, substantially as set forth.

11. The combination, with the buckstays and the iron beams, of the columns supported between such beams and buckstays, the cable-wheels and the bearings for the axes of such cable-wheels, and the bar $A^3$, supported by the frame of the buckstay and adjacent to the lower edge of the wheel 11, substantially as set forth.

12. The combination, with the cable-wheels 4 and 11 and the supports for the same, of the bar below the wheel 11 and the frame of the buckstay for supporting the same, and the inclined track U between the cable-wheels 4 and 11, substantially as set forth.

13. The combination, with the wheels 4 and 11 and the supports for the same, of the track U between the wheels 4 and 11, and the deflector-guard 25 above the wheel 4, substantially as set forth.

14. The combination, with the curves of a cable railway and two cables, of the guiding-pulleys, one above the other, at the curves in which the cables are maintained continuously in position, one at a higher elevation than the other, and a single grip changeable from one cable to the other and adapted to being raised and lowered to the level of the cable, substantially as specified.

15. The combination, with the wheels 4 and 11 and columns 9, of the bearers 2, 10, and 12, and the movable cap-pieces bolted to the bearers and serving to connect the columns and bearers, substantially as set forth.

Signed by me this 5th day of February, 1890.

J. H. PENDLETON.

Witnesses:
GEO. T. PINCKNEY,
WILLIAM G. MOTT.